(12) United States Patent
Matsui et al.

(10) Patent No.: US 10,414,695 B2
(45) Date of Patent: Sep. 17, 2019

(54) MONOLITHIC REFRACTORY

(71) Applicant: NIPPON STEEL & SUMITOMO METAL CORPORATION, Tokyo (JP)

(72) Inventors: Tsuyoshi Matsui, Tokyo (JP); Koji Goda, Kitakyushu (JP); Atsunori Koyama, Omuta (JP); Yoshitaka Sadatomi, Kitakyushu (JP); Tsubasa Nakamichi, Kitakyushu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/763,699

(22) PCT Filed: Sep. 29, 2016

(86) PCT No.: PCT/JP2016/078806
§ 371 (c)(1),
(2) Date: Mar. 27, 2018

(87) PCT Pub. No.: WO2017/057566
PCT Pub. Date: Apr. 6, 2017

(65) Prior Publication Data
US 2018/0282231 A1 Oct. 4, 2018

(30) Foreign Application Priority Data

Sep. 29, 2015 (JP) .................. 2015-191739
Sep. 15, 2016 (JP) .................. 2016-180517

(51) Int. Cl.
*C04B 35/66* (2006.01)
*F27D 1/06* (2006.01)
*C04B 35/101* (2006.01)
*C04B 35/626* (2006.01)
*C04B 35/63* (2006.01)
*C04B 35/632* (2006.01)
*F27D 1/10* (2006.01)
*C21B 7/06* (2006.01)

(52) U.S. Cl.
CPC .......... *C04B 35/66* (2013.01); *C04B 35/1015* (2013.01); *C04B 35/6269* (2013.01); *C04B 35/62685* (2013.01); *C04B 35/6303* (2013.01); *C04B 35/6325* (2013.01); *F27D 1/06* (2013.01); *F27D 1/10* (2013.01); *C04B 2235/322* (2013.01); *C04B 2235/3206* (2013.01); *C04B 2235/3208* (2013.01); *C04B 2235/3213* (2013.01); *C04B 2235/3217* (2013.01); *C04B 2235/3222* (2013.01); *C04B 2235/3418* (2013.01); *C04B 2235/449* (2013.01); *C04B 2235/5409* (2013.01); *C04B 2235/5427* (2013.01); *C04B 2235/5436* (2013.01); *C04B 2235/5445* (2013.01); *C04B 2235/5472* (2013.01); *C04B 2235/61* (2013.01); *C04B 2235/78* (2013.01); *C04B 2235/9676* (2013.01); *C21B 7/06* (2013.01)

(58) Field of Classification Search
CPC ..... C04B 35/66; C04B 35/443; C04B 35/101; C04B 35/043
See application file for complete search history.

(56) References Cited

U.S. PATENT DOCUMENTS

| | | | |
|---|---|---|---|
| 5,589,426 A | 12/1996 | Iwasaki et al. | |
| 8,309,483 B2 * | 11/2012 | Saito ................ | C04B 7/32 106/692 |
| 8,673,797 B2 * | 3/2014 | Saito ................ | B82Y 30/00 423/594.16 |
| 8,835,338 B2 * | 9/2014 | Saito ................ | C04B 7/32 106/692 |
| 10,000,415 B2 * | 6/2018 | Kono ................ | C04B 35/66 |
| 2011/0039683 A1 * | 2/2011 | Saito ................ | C04B 7/32 501/125 |
| 2011/0251045 A1 * | 10/2011 | Saito ................ | B82Y 30/00 501/125 |
| 2013/0090229 A1 * | 4/2013 | Saito ................ | C04B 7/32 501/120 |

FOREIGN PATENT DOCUMENTS

| | | |
|---|---|---|
| EP | 1264810 A1 | 12/2002 |
| EP | 2565174 A1 | 3/2013 |
| JP | 6-48845 A | 2/1994 |
| JP | 7-206531 A1 | 8/1995 |
| JP | 11-130550 A | 5/1999 |
| JP | 11-240773 A | 9/1999 |
| JP | 2000-319073 A | 11/2000 |
| JP | 2003-201183 A | 7/2003 |

(Continued)

OTHER PUBLICATIONS

Korean Notice of Allowance dated Nov. 9, 2018, issued in Korean Patent Application No. 10-2018-7008028 with English translation.
(Continued)

*Primary Examiner* — Karl E Group
(74) *Attorney, Agent, or Firm* — Birch, Stewart, Kolasch & Birch, LLP

(57) ABSTRACT

In a monolithic refractory, in terms of a proportion in 100 mass % of a refractory raw material having a grain size of 8 mm or smaller, an amount of $Ca_xSr_{1-x}Al_2O_4$ (where, $0 \leq X \leq 0.5$) is 0.5 mass % or more and 10 mass % or less, and a polyvalent metal salt of oxycarboxylic acid is 0.05 mass % or more and 1.0 mass % or less.

6 Claims, No Drawings

(56) References Cited

FOREIGN PATENT DOCUMENTS

| | | |
|---|---|---|
| JP | 2008-290934 A | 12/2008 |
| KR | 10-1998-0079742 | 11/1998 |
| WO | WO 2009/130811 A1 | 10/2009 |
| WO | WO 2011/136365 A1 | 11/2011 |

OTHER PUBLICATIONS

International Seared Report (PCT/ISA/210) issued in PCT/JP2016/078806, dated Nov. 29, 2016.
Written Opinion (PCT/ISA/237) issued in PCT/JP2016/078806, dated Nov. 29, 2016.
Canadian Office Action for Canadian Counterpart Application No. 2,999,834, dated Mar. 26, 2019.
Extended European Search Report dated Mar. 15, 2019, for European Counterpart Application No. 16851737.3.
Indian Examination Report, dated Jun. 19, 2019, for corresponding Indian Application No. 201817015449, with an English translation.

* cited by examiner

MONOLITHIC REFRACTORY

TECHNICAL FIELD OF THE INVENTION

The present invention relates to a monolithic refractory mainly used in a steelmaking processing apparatus.

The present application claims priority based on Japanese Patent Application No. 2015-191739 filed on Sep. 29, 2015 and Japanese Patent Application No. 2016-180517 filed on Sep. 15, 2016 and the contents of which are incorporated herein.

RELATED ART

In the steelmaking processing apparatus, an alumina-magnesia based or alumina-spinel based monolithic refractory is frequently used as a refractory coming into contact with molten steel or slag, and aluminous cement is generally used for the bonding material of the monolithic refractory. In these monolithic refractories, after being kneaded with water, a predetermined shape is imparted thereto by a casting work method and $Ca^{2+}$ ions and $Al(OH)_4^-$ ions are precipitated and deposited from aluminous cement of the bonding material during hardening to form a hydrate. In these monolithic refractories, the strength required as a structure is developed. In addition, since $Ca^{2+}$ ions and $Al(OH)_4^-$ ions precipitated from the aluminous cement cause ultrafine powder to agglomerate, the strength is also developed by the agglomeration. General aluminous cement contains $CaO-Al_2O_3$ and $CaO-2Al_2O_3$ as main components. Some of aluminous cement also contains $12CaO-7Al_2O_3$, $Al_2O_3$, or the like. $Ca^{2+}$ ions and $Al(OH)_4^-$ ions are precipitated from $CaO-Al_2O_3$, $CaO-2Al_2O_3$, and $12CaO-7Al_2O_3$.

In such a manner, aluminous cement is an important raw material to impart strength to the monolithic refractory. However, since the aluminous cement has CaO at a high content rate, the aluminous cement reacts with other raw materials in the monolithic refractory and slag generated at the steelmaking process to form a low-melting product. Therefore, there is a disadvantage of deteriorating corrosion resistance to the slag of the monolithic refractory.

Therefore, a monolithic refractory hardened by reaction of magnesia to polyvalent metal salt of oxycarboxylic acid without using the aluminous cement disclosed in Patent Document 1 or a monolithic refractory using $Ca_XSr_{1-X}Al_2O_4$ disclosed in Patent Document 2 as a bonding material is proposed.

PRIOR ART DOCUMENT

Patent Document

[Patent Document 1] Japanese Unexamined Patent Application, First Publication No. H11-130550
[Patent Document 2] Japanese Unexamined Patent Application, First Publication No. 2008-290934

DISCLOSURE OF THE INVENTION

Problems to be Solved by the Invention

In the monolithic refractory hardened by reaction of magnesia to polyvalent metal salt of oxycarboxylic acid disclosed in Patent Document 1, $Mg^{2+}$ ions precipitated from a magnesia raw material react with a polyvalent metal salt of oxycarboxylic acid to gelate, thereby forming a bonding portion. Therefore, in order to obtain a sufficiently hardened state, it is required to use an extremely fine and caustic magnesia raw material. In a case where the extremely fine and caustic magnesia raw material is not used, since an precipitation rate of $Mg^{2+}$ ions is slow, in the monolithic refractory, developing of strength is extremely slow and the strength becomes low. On the other hand, the extremely fine and caustic magnesia raw material may become inactive by occurrence of carbonation due to carbon dioxide in air or hydroxylation due to vapor. In a case where the magnesia raw material is inactivated depending on a storage condition in this manner, in the monolithic refractory, developing of strength is extremely slow and the strength becomes low.

In addition, in the monolithic refractory using $Ca_XSr_{1+X}Al_2O_4$ disclosed in Patent Document 2 as a bonding material, formation of a hydrate is slow as compared to the monolithic refractory using aluminous cement of the related art. Therefore, developing of strength is slow and the strength becomes low. Since $Sr^{2+}$ ions in addition to $Ca^{2+}$ ions and $Al(OH)_4^-$ ions are precipitated from $Ca_XSr_{1-X}Al_2O_4$, it is possible to increase the strength using aggregation by increasing an amount of ultrafine powders. However, in a case where the amount of the ultrafine powder increases, sintering progresses at a high temperature. Therefore, in the monolithic refractory, thermal spalling resistance is deteriorated and a crack or a exfoliation during use becomes to occur frequently.

Therefore, an object to be solved by the present invention is to quickly develop and increase the strength of a monolithic refractory in which the aluminous cement is not used or an extremely small amount of the aluminous cement is used, and an amount of CaO is small.

Means for Solving the Problem

The summary of the present invention is as follows.

(1) According to an aspect of the present invention, there is provided a monolithic refractory, in which, in terms of a proportion in 100 mass % of a refractory raw material having a grain size of 8 mm or smaller, an amount of $Ca_XSr_{1-X}Al_2O_4$ (where, $0 \leq X \leq 0.5$) is 0.5 mass % or more and 10 mass % or less, and an amount of a polyvalent metal salt of oxycarboxylic acid is 0.05 mass % or more and 1.0 mass % or less.

(2) In the monolithic refractory according to (1), an amount of the polyvalent metal salt of oxycarboxylic acid may be 0.1 mass % or more and 1.0 mass % or less.

(3) In the monolithic refractory according to (1) or (2), in terms of a proportion in 100 mass % of a refractory raw material having a grain size of 8 mm or smaller, a total amount of $Ca_XSr_{1-X}Al_2O_4$ (where, $0 \leq X \leq 0.5$), $Ca_YSr_{1-Y}Al_4O_7$ (where, $0 \leq Y \leq 0.5$), and $12(CaO)_Z(SrO)_{1-Z} \cdot 7Al_2O_3$ (where, $0 \leq Z \leq 0.5$) may be 10 mass % or less.

(4) In the monolithic refractory according to any one of (1) to (3), in terms of a proportion in 100 mass % of the refractory raw material, an amount of a magnesia raw material having a grain size of 0.1 mm or smaller may be 3 mass % or more and 12 mass % or less.

(5) In the monolithic refractory according to any one of claims (1) to (3), in terms of a proportion in 100 mass % of the refractory raw material, an amount of a spinel raw material having a grain size of 0.1 mm or smaller may be 5 mass % or more and 25 mass % or less.

(6) In the monolithic refractory according to any one of (1) to (5), in terms of a proportion in 100 mass % of the refractory raw material, a total amount of a spinel raw material or an alumina raw material, having a grain size of larger than 0.1 mm and 8 mm or smaller, or combination thereof may be 55 mass % or more and 75 mass % or less.

Effects of the Invention

According to the aspect of the present invention, by using $Ca_xSr_{1-x}Al_2O_4$ as a bonding material and the polyvalent metal salt of the oxycarboxylic acid in combination, it is possible to obtain a monolithic refractory in which hardening is faster and the strength is higher than a case of using the magnesia of the related art and the polyvalent metal salt of the oxycarboxylic acid in combination. In a case where the monolithic refractory is kept for a long time, a change over time becomes extremely small. In addition, it is possible to obtain the monolithic refractory in which hardening is faster and the strength is higher than a case of using $Ca_xSr_{1-x}Al_2O_4$ alone. That is, according to the aspect of the present invention, it is possible to quickly develop and increase the strength of the monolithic refractory in which the aluminous cement is not used or an extremely small amount of the aluminous cement is used, and an amount of CaO is small. It is possible to reduce the change over time during long-term storage.

EMBODIMENTS OF THE INVENTION

Hereinafter, a monolithic refractory according to an embodiment of the present invention will be described in detail.

The monolithic refractory according to the present embodiment can be mainly applied to an alumina-magnesia based monolithic refractory and an alumina-spinel based monolithic refractory.

In a case where the monolithic refractory according to the present embodiment is the alumina-magnesia based monolithic refractory, typically, the monolithic refractory is formed of a main raw material including an alumina raw material, a magnesia raw material, and ultrafine powder silica, a bonding material including $Ca_xSr_{1-x}Al_2O_4$ (where, $0 \leq X \leq 0.5$) and a polyvalent metal salt of oxycarboxylic acid, and admixture and chemical admixture used for a common monolithic refractory. However, in a case where there is no problem of slaking of the magnesia when performing drying or in a case where hot strength is regarded as important, the ultrafine powder silica may not be used. In addition, in order to increase corrosion resistance, some of the alumina raw material and the magnesia raw material can be used by being substituted with the spinel raw material.

In a case where the monolithic refractory according to the present embodiment is alumina-spinel based monolithic refractory, typically, the monolithic refractory is formed of a main raw material including the alumina raw material and the spinel raw material, a bonding material including $Ca_xSr_{1-x}Al_2O_4$ (where, $0 \leq X \leq 0.5$) and a polyvalent metal salt of oxycarboxylic acid, and admixture and chemical admixture used for the common monolithic refractory. In addition, in order to increase the corrosion resistance or the thermal spalling resistance, some of the alumina raw material and the spinel raw material can be used by being substituted with the magnesia raw material.

Here, the admixture refers to an organic fiber, an Al powder, a metal fiber, or the like used for the common monolithic refractory. The chemical admixture refers to a water reducing agent, an AE agent, an antifoaming agent, a hardening regulator, a flowability regulator, a magnesia-slaking inhibitor, an explosion inhibitor, or the liked used for the common monolithic refractory. In the present specification, all of the raw materials of the monolithic refractory excluding the admixture refer to the refractory raw materials.

In the monolithic refractory according to the present embodiment, the polyvalent metal salt of oxycarboxylic acid is used together with $Ca_xSr_{1-x}Al_2O_4$ (where, $0 \leq X \leq 0.5$) as the bonding material. $Ca_xSr_{1-x}Al_2O_4$ in the monolithic refractory kneaded with water precipitates $Sr^{2+}$ ions, $Ca^{2+}$ ions, and $Al(OH)_4^-$ ions. The polyvalent metal salt of oxycarboxylic acid reacts with the precipitated ions to gelate, and the strength is developed. When using only $Ca_xSr_{1-x}Al_2O_4$, since formation of the hydrate is slow, developing of the strength is slow and the strength becomes low. However, when the polyvalent metal salt of oxycarboxylic acid is used in combination, since a formation of the bonding portion by gelation of the polyvalent metal salt of oxycarboxylic acid is added, the strength is developed quickly and the strength becomes high.

According to the monolithic refractory according to the present embodiment, the strength is developed faster and the strength becomes higher compared to a method of forming the bonding portion by combining the extremely fine and caustic magnesia raw material of the related art and the polyvalent metal salt of oxycarboxylic acid. This is considered to be because an amount of $Sr^{2+}$ ions, $Ca^{2+}$ ions, and $Al(OH)_4^-$ ions precipitated from $Ca_xSr_{1-x}Al_2O_4$ is larger than an amount of $Mg^{2+}$ ions precipitated from the magnesia raw material and further, when using $Ca_xSr_{1-x}Al_2O_4$ rather than the magnesia raw material, a pH of kneading water becomes high. A reaction between MgO and water is $MgO + H_2O \rightarrow Mg(OH)_2$. An amount of $Mg(OH)_2$ dissolved in 100 g of water (25° C.) is approximately 1 mg and a pH of dissolving water is approximately 10.5. Meanwhile, a reaction between SrO in $Ca_xSr_{1-x}Al_2O_4$ and water is $SrO + H_2O \rightarrow Sr(OH)_2$. An amount of $Sr(OH)_2$ dissolved in 100 g of water (25° C.) is approximately 1 g and a pH of dissolving water is approximately 13.5. In this manner, it is estimated that when a large amount of $Sr(OH)_2$ dissolved in water is dissolved, that is, an amount of $Sr^{2+}$ ions precipitated from $Ca_xSr_{1-x}Al_2O_4$ is large, the pH of kneading water becomes high. In the polyvalent metal salt of oxycarboxylic acid, gelation progresses as pH becomes high. For example, it is reported that, in a basic aluminum lactate which is one of the polyvalent metal salts of oxycarboxylic acid, the gelation progresses when the pH thereof is 10 or higher. It is estimated that, in the method of using $Ca_xSr_{1-x}Al_2O_4$, since an amount of precipitated ions is larger than that of the method using the magnesia raw material of the related art and pH becomes high, the polyvalent metal salt of oxycarboxylic acid is gelated faster and a large amount of gel are formed.

In addition, in a combination of the magnesia raw material or the related art and the polyvalent metal salt of oxycarboxylic acid, the strength is developed by only formation of gel of the polyvalent metal salt of oxycarboxylic acid. Meanwhile, in a combination of $Ca_xSr_{1-x}Al_2O_4$ and the polyvalent metal salt of oxycarboxylic acid, formation of the gel of the polyvalent metal salt of oxycarboxylic acid and formation of hydrate of $Ca_xSr_{1-x}Al_2O_4$ occur at the same time, it is estimated that a composited bonding portion having a higher strength is formed. Also, it is considered that the monolithic refractory according to the present embodiment is a factor that causes the strength to be developed faster and the strength to be higher than the related art.

Furthermore, since in the method of forming a bonding portion by combining the magnesia raw material of the related art and the polyvalent metal salt of oxycarboxylic acid, an amount of $Mg^{2+}$ ions precipitated from the magnesia is small as described above, it is required to use an extremely fine and caustic magnesia raw material in order to quickly form the bonding portion and increase the amount to be formed. However, the extremely fine and caustic magnesia raw material may become inactive by occurrence of carbonation due to carbon dioxide in air or hydroxylation due to vapor. In a case where the magnesia raw material is inactivated due to a storage condition, in the monolithic refractory, developing of strength is extremely slow and the strength becomes low, but when using $Ca_XSr_{1-X}Al_2O_4$ of the present embodiment, there is little deterioration due to such change over time.

From the combination of the magnesia raw material of the related art and the polyvalent metal salt of oxycarboxylic acid, a method of using strontia (SrO) raw material which is the same alkaline earth metal oxide and the polyvalent metal salt of oxycarboxylic acid in combination can be inferred. However, in a case where the combination is simply applied, when the monolithic refractory is kneaded with water, fluidity is lowered in a short time. Accordingly, it becomes difficult to work. This is considered to be because the strontia reacts with water while generating heat violently to rapidly precipitate a large amount of $Sr^{2+}$ ions thereby also rapidly proceeding the gelation of the polyvalent metal salt of oxycarboxylic acid. The present inventors were found that when the strontia is used as a composite oxide of $Ca_XSr_{1-X}Al_2O_4$, the precipitation rate of $Sr^{2+}$ ions is suppressed and a gelation rate of the polyvalent metal salt of oxycarboxylic acid is also suppressed, therefore it is possible to control a hardening rate appropriate for the work of the monolithic refractory and the strength becomes high as described above.

Even with a combination of the aluminous cement and the polyvalent metal salt of oxycarboxylic acid, polyvalent metal salt of oxycarboxylic acid gelates by $Ca^{2+}$ ions and $Al(OH)_4^-$ ions precipitated from the aluminous cement to develop the strength; however, in a case of combining $Ca_XSr_{1-X}Al_2O_4$ and the polyvalent metal salt of oxycarboxylic acid, the strength development is fast and the strength becomes high. This is considered to be because the reaction of CaO in the aluminous cement with water is $CaO+H_2O \rightarrow Ca(OH)_2$, an amount of $Ca(OH)_2$ dissolved in 100 g (25° C.) of water is 0.14 g, and the pH thereof is approximately 12.4, therefore in case of using $Ca_XSr_{1-X}Al_2O_4$, an amount of precipitated ions is large and a pH of kneading water becomes high. In addition, since when using the aluminous cement, an amount of CaO in the monolithic refractory becomes large to deteriorate the corrosion resistance, the monolithic refractory according to the present embodiment using the polyvalent metal salt of oxycarboxylic acid together with $Ca_XSr_{1-X}Al_2O_4$ is appropriate for a use under a strict condition.

In the monolithic refractory according to the present embodiment, an amount of $Ca_XSr_{1-X}Al_2O_4$ to be used is set to, in terms of a proportion in 100 mass % of the refractory raw material having a grain size of 8 mm or smaller, 0.5 mass % or more and 10 mass % or less. In a case of less than 0.5 mass %, hardening of the monolithic refractory is slow and the strength thereof is insufficient. In addition, in a case of more than 10 mass %, hardening of the monolithic refractory becomes too fast and it is easy to be sintered at a high temperature, thereby deteriorating the thermal spalling resistance. In addition, a value of X in $Ca_XSr_{1-X}Al_2O_4$ is set to $0 \leq X \leq 0.5$. This is because that when X is greater than 0.5, an amount of CaO becomes large and the corrosion resistance of the monolithic refractory is deteriorated. In a case where X is set to be small as possible, since an amount of CaO in the monolithic refractory is small, the corrosion resistance of the monolithic refractory increases. The X may also be zero.

In addition, in the monolithic refractory according to the present embodiment, it is possible to use $Ca_YSr_{1-Y}Al_4O_7$ (where, $0 \leq Y \leq 0.5$) and $12(CaO)_Z(SrO)_{1-Z}\cdot 7Al_2O_3$ (where, $0 \leq Z \leq 0.5$) which are the same $CaO$—$SrO$—$Al_2O_3$ based solid solutions as $Ca_XSr_{1-X}Al_2O_4$. It is preferable that a total amount of $Ca_XSr_{1-X}Al_2O_4$, $Ca_YSr_{1-Y}Al_4O_7$, and $12(CaO)_Z(SrO)_{1-Z}\cdot 7Al_2O_3$ to be used is 10 mass % or less, in terms of a proportion in 100 mass % of a refractory raw material having a grain size of 8 mm or smaller. In a case of more than 10 mass %, it is easy to be sintered at the high temperature, thereby deteriorating the thermal spalling resistance. Values of Y and Z are respectively set to $0 \leq Y \leq 0.5$ and $0 \leq Z \leq 0.5$. This is because that when the Y and the Z are greater than 0.5 as in the $Ca_XSr_{1-X}Al_2O_4$, the amount of CaO becomes large and the corrosion resistance of the monolithic refractory is deteriorated. When using $Ca_YSr_{1-Y}Al_4O_7$, hardening of the monolithic refractory becomes slow compared to a case of using $Ca_XSr_{1-X}Al_2O_4$, and when using $12(CaO)_Z(SrO)_{1-Z}\cdot 7Al_2O_3$, the hardening becomes fast. Therefore, it becomes easy to adjust a hardening time of the monolithic refractory by using these in combination.

In the monolithic refractory according to the present embodiment, it is possible to use the aluminous cement in addition to $Ca_XSr_{1-X}Al_2O_4$, $Ca_YSr_{1-Y}Al_4O_7$, and $12(CaO)_Z(SrO)_{1-Z}\cdot 7Al_2O_3$. However, since CaO included in the aluminous cement deteriorates the corrosion resistance of the monolithic refractory, it is preferable that a total amount of CaO included in $Ca_XSr_{1-X}Al_2O_4$, $Ca_YSr_{1-Y}Al_4O_7$, $12(CaO)_Z(SrO)_{1-Z}\cdot 7Al_2O_3$, and the aluminous cement is 0.5 by mass or less, in terms of a proportion in 100 mass % of a refractory raw material having a grain size of 8 mm or smaller.

As a method of manufacturing $Ca_XSr_{1-X}Al_2O_4$, a method is exemplified in which limestone (mainly, $CaCO_3$), burnt lime (mainly, CaO), purified alumina ($\alpha\text{-}Al_2O_3$ and $Al(OH)_3$) or bauxite ($Al_2O_3$ raw material), and strontianite ($SrCO_3$) or celestite ($SrSO_4$) are prepared as raw materials, the raw materials are mixed to have a targeted composition molar ratio and melted or fired at a high temperature of 1100° C. or higher, preferably 1300° C. or higher, and more preferably 1500° C. or higher, using an electric furnace, a reflection furnace, a furnace, a vertical furnace, a shaft kiln, or a rotary kiln. It is preferable to have high purity in which a total amount of CaO, $Al_2O_3$, and SrO in the raw material is 98 mass % or more. There is a concern that impurities, such as $TiO_2$, MgO, and $Fe_2O_3$, included in the bauxite or celestite lower physical property at a high temperature, it is preferable that an amount of impurities is extremely small.

The temperature and melting or firing time vary depending on specifications of a furnace such as a volume and heating capacity. A formed phase of a sample after performing melting and firing is in practice confirmed by X-ray diffraction. It is important to confirm whether the targeted $Ca_XSr_{1-X}Al_2O_4$ is formed.

It is preferable that the raw materials are pulverized with a pulverizer such that a 50% average diameter becomes to approximately 0.5 to 100 μm, before performing the melting or firing. This is because that when grains coarser than the above are included, multiple unreacted portions remain and original effects of the monolithic refractory according to the present embodiment may not be exhibited in some cases. In addition, it is preferable that, after performing the melting or firing, the grains are cooled and subjected to sizing such that a grain size becomes to approximately 1 to 20 μm with a pulverizer. The grain size is a measurement result by a grain size analyzer using a laser diffraction method, a laser scattering method, a precipitation balance method, or the like, and represents a 50% average diameter.

For mixing of the raw materials, a mixer such as an eirich mixer, a rotary drum, a cone blender, a V-type blender, an omni mixer, a nauta mixer, and pan type mixer can be used to homogenize the mixture.

As the pulverizer, it is possible to use a pulverizer for an industrial use such as a vibration mill, a tube mill, a ball mill, and a roller mill. In addition, it is possible to use some of raw materials used in the monolithic refractory by being pulverized at the same time. For example, when $Ca_XSr_{1-X}Al_2O_4$ and calcined alumina are pulverized at the same time to be used, since $Ca_XSr_{1-X}Al_2O_4$ and the calcined alumina are uniformly dispersed in the monolithic refractory, fluidity becomes good even when the monolithic refractory is kneaded with a small amount of water and the strength becomes high.

$Ca_YSr_{1-Y}Al_4O_7$ and $12(CaO)_Z(SrO)_{1-Z}\cdot 7Al_2O_3$ can be manufactured by mixing raw materials to have a targeted composition molar ratio using the same method as that of $Ca_XSr_{1-X}Al_2O_4$. In addition, $Ca_YSr_{1-Y}Al_4O_7$ and $12(CaO)_Z(SrO)_{1-Z}\cdot 7Al_2O_3$ can be manufactured by mixing raw materials such that not only a $Ca_XSr_{1-X}Al_2O_4$ phase exists but also $Ca_YSr_{1-Y}Al_4O_7$ phase or $12(CaO)_Z(SrO)_{1-Z}\cdot 7Al_2O_3$ phase coexists therewith.

In the monolithic refractory according to the present embodiment, and amount of the polyvalent metal salt of oxycarboxylic acid to be used is set to 0.05 mass % or more and 1.0 mass % or less, in terms of a proportion in 100 mass % of the refractory raw material having a size of 8 mm or smaller. In a case of less than 0.05 mass %, hardening of the monolithic refractory is slow and the strength thereof is insufficient. In a case of more than 1.0 mass %, constriction of the monolithic refractory during hardening and drying, which is considered to occur due to constriction of gel, increases, and volume stability is deteriorated. In a case where form removal of a formboard or a core is carried out in a short period of time or in a case where working is performed at a low temperature, in order to accelerate the hardening, it is preferable that an amount of the polyvalent metal salt of oxycarboxylic acid to be used is 0.1 mass % or more and 1.0 mass % or less, in terms of a proportion in 100 mass % of the refractory raw material having a size of 8 mm or smaller.

As the polyvalent metal salt of oxycarboxylic acid, it is possible to use an aluminum salt of aliphatic oxycarboxylic acid such as glycolic acid, lactic acid, hydroacrylic acid, oxybutyric acid, glyceric acid, malic acid, tartaric acid, and citric acid, and a normal salt and a basic salt such as an iron salt, a chromium salt, a zirconium salt, and a titanium salt. Examples thereof include aluminum lactate, basic aluminum lactate, aluminum glycolate, aluminum glycolate lactate, and basic aluminum glycolate lactate.

In a case where the monolithic refractory according to the present embodiment is an alumina-magnesia based monolithic refractory, it is preferable that, in terms of a proportion in 100 mass % of a refractory raw material having a grain size of 8 mm or smaller, an amount of $Ca_XSr_{1-X}Al_2O_4$ (where, 0≤X≤0.5) is 0.5 mass % or more and 10 mass % or less, an amount of the polyvalent metal salt of oxycarboxylic acid is 0.05 mass % or more and 1.0 mass % or less, and an amount of the magnesia raw material having a grain size of 0.1 mm or smaller is 3 mass % or more and 12 mass % or less. When composition is adjusted as above, it is possible to obtain a monolithic refractory in which time for strength developing is appropriate, strength is high, corrosion resistance and slag infiltration resistance are high, and thermal spalling resistance is high.

In addition, in a case where the monolithic refractory according to the present embodiment is an alumina-spinel based monolithic refractory, it is preferable that, in terms of a proportion in 100 mass % of a refractory raw material having a grain size of 8 mm or smaller, an amount of $Ca_XSr_{1-X}Al_2O_4$ (where, 0≤X≤0.5) is 0.5 mass % or more and 10 mass % or less, an amount of the polyvalent metal salt of oxycarboxylic acid is 0.05 mass % or more and 1.0 mass % or less, and an amount of a spinel raw material having a grain size of 0.1 mm or smaller is 5 mass % or more and 25 mass % or less. When composition is adjusted as above, it is possible to obtain a monolithic refractory in which time for strength developing is appropriate, strength is high, corrosion resistance and slag infiltration resistance are high, and thermal spalling resistance is high.

In the monolithic refractory according to the present embodiment, the refractory raw material to be an aggregate, having a grain size of larger than 0.1 mm and 8 mm or smaller, can be mainly formed of the alumina raw material or the spinel raw material or a combination thereof. Typically, in terms of a proportion in 100 mass % of a refractory raw material having a grain size of 8 mm or smaller, a total amount of a spinel raw material or an alumina raw material, having a grain size of larger than 0.1 mm and 8 mm or smaller, or combination thereof may be 55 mass % or more and 75 mass % or less.

A refractory raw material (main material) which can be appropriately used for the monolithic refractory according to the present embodiment is exemplified as follow.

As an alumina raw material, a raw material which is obtained by being manufactured by electrofusion or sintering and subjecting to sizing and a raw material manufactured by Bayer method, called calcination alumina are used. The raw material which is obtained by being manufactured by electrofusion or sintering and subjecting to sizing and in which an amount of $Al_2O_3$ is 90 mass % or more and preferably 99 mass % or more is used. The calcined alumina is a raw material called a reactive alumina or calcined alumina.

As a spinel raw material, a raw material which is obtained by being manufactured by electrofusion or sintering and subjecting to sizing is used, the raw material being a $MgO$—$Al_2O_3$ based compound of which a chemical composition is a stoichiometry composition of $MgO$—$Al_2O_3$ and a nonstoichiometry composition in which MgO or $Al_2O_3$ excessively forms a solid solution. It is possible to also use a raw material in which spinel and alumina are combined.

As a magnesia raw material, a raw material which is obtained by being manufactured by electrofusion or sintering and subjecting to sizing is used. It is preferable to use a magnesia raw material having high slaking resistance such that a crack due to volume expansion by slaking of the magnesia raw material during drying is prevented from being generated. Examples of the magnesia raw material having high slaking resistance include a material having low $CaO/SiO_2$ of CaO and $SiO_2$ which are impurities, a material without a fracture surface, and a material subjected to surface coating. The magnesia raw material reacts with the alumina raw material during being used to form spinel. Therefore, when using a fine magnesia raw material, spinel to be formed becomes fine and corrosion resistance and slag infiltration resistance become high. When using a coarse magnesia raw material, a speed of spinel formation indicating volume expansion becomes slow and the monolithic refractory shows continued residual expansion, thereby decreasing cracks.

The ultrafine powder silica is an amorphous $SiO_2$ based raw material having a grain size of 1 μm or smaller, which is called silica flower, silica hume, fumed silica, micro silica, evaporated silica, or silica dust. The ultrafine powder silica is generally formed by oxidation of SiO gas generated during manufacturing of Si, Fe—Si, $ZrO_2$, or the like in the air. In the alumina-magnesia based monolithic refractory, it is preferable to use the ultrafine powder silica in a range of 2 mass % or less, in terms of a proportion in 100 mass % of a refractory raw material having a grain size of 8 mm or smaller, in order to prevent the magnesia raw material from slaking, reduce expansion due to spinel formation, impart creep property at the time of use, or the like.

In addition, as a refractory raw material of the monolithic refractory according to the present embodiment, it is also possible to use so-called recycled raw material, which is a used refractory brick or reused monolithic refractory. As the recycled raw material, it is preferable to reuse alumina-spinel based or alumina-magnesia based used refractory brick or the monolithic refractory.

Further, in the monolithic refractory according to the present embodiment, it is also possible to use a refractory raw material having a grain size of 8 mm or larger, in order to prevent a crack from propagating to reduce a crack or exfoliation from occurring or increase corrosion resistance with dense and large aggregate. Here, an amount of the monolithic refractory to be used is preferably 40 mass % or less, as an outer percentage, with respect to 100 mass % of the refractory raw material having a grain size of 8 mm or smaller.

In addition, in the monolithic refractory according to the present embodiment, as other refractory raw materials, it is possible to use zirconia, mullite, alumina-zirconia, zirconia-mullite, chromia, or the like. It is preferable that an amount thereof to be used is 10 mass % or less, in terms of a proportion in 100 mass % of a refractory raw material having a grain size of 8 mm or smaller.

The monolithic refractory according to the present embodiment described above can be appropriately used for casting work or wet type spraying work.

EXAMPLES

Tables 1 to 3 show raw material configurations and evaluated results of Examples 1 to 29 and Comparative Examples 1 to 5 of the present invention.

TABLE 1

|  |  |  | Example | | | | | | | |
|---|---|---|---|---|---|---|---|---|---|---|
|  |  |  | 1 | 2 | 3 | 4 | 5 | 6 | 7 | 8 |
| Refractory raw material | Sintered alumina 8 to 0.1 mm (by mass %) | | 65 | 64.5 | 64.5 | 64.6 | 64.5 | 64.5 | 64.5 | 64.7 |
| | Sintered spinel 8 to 0.1 mm (by mass %) | | — | — | — | — | — | — | — | — |
| | Sintered alumina + Calcined alumina 0.1 mm or smaller (by mass %) | | 27.5 | 27.5 | 23.5 | 18.5 | 23.5 | 23.5 | 23.5 | 23.5 |
| | Sintered spinel 0.1 mm or smaller (by mass %) | | — | — | — | — | — | — | — | — |
| | Sintered magnesia 0.1 mm or smaller (by mass %) | | 6 | 6 | 6 | 6 | 6 | 6 | 6 | 6 |
| | Caustic magnesia (by mass %) | | — | — | — | — | — | — | — | — |
| | Silica flower (by mass %) | | 0.5 | 0.5 | 0.5 | 0.5 | 0.5 | 0.5 | 0.5 | 0.5 |
| | Aluminous cement (by mass %) | | — | — | — | — | — | — | — | — |
| | $Ca_XSr_{1-X}Al_2O_4$ | Addition amount (by mass %) | 0.5 | 1 | 5 | 10 | 5 | 5 | 5 | 5 |
| | | Value of X | 0 | 0.1 | 0.1 | 0.1 | 0 | 0.3 | 0.5 | 0.1 |
| | $Ca_YSr_{1-Y}Al_4O_7$ | Addition amount (by mass %) | — | — | — | — | — | — | — | — |
| | | Value of Y | — | — | — | — | — | — | — | — |
| | $12(CaO)_Z(SrO)_{1-Z}\cdot 7Al_2O_3$ | Addition amount (by mass %) | — | — | — | — | — | — | — | — |
| | | Value of Z | — | — | — | — | — | — | — | — |
| | Polyvalent metal salt A of oxycarboxylic acid (by mass %) | | 0.3 | 0.3 | 0.3 | 0.2 | 0.3 | 0.3 | 0.3 | 0.1 |
| | Polyvalent metal salt B of oxycarboxylic acid (by mass %) | | — | — | — | — | — | — | — | — |
| | Chemical admixture (by mass %) | | 0.2 | 0.2 | 0.2 | 0.2 | 0.2 | 0.2 | 0.2 | 0.2 |
| Evaluation | Time for hardening | | A | A | A | A | B | A | A | A |
| | Change over time | | A | A | A | A | A | A | A | A |
| | Dry constriction | | A | A | A | B | A | A | A | A |
| | Bending strength | | B | B | A | A | A | A | A | B |
| | Rotary erosion spall | | A | A | A | A | A | A | B | A |
| | Comprehensive evaluation | | A | A | AA | A | A | AA | A | A |

TABLE 1-continued

|  |  |  | Example |  |  |  |  |  |  |
|---|---|---|---|---|---|---|---|---|---|
|  |  |  | 9 | 10 | 11 | 12 | 13 | 14 | 15 |
| Refractory raw material | Sintered alumina 8 to 0.1 mm (by mass %) |  | 64.2 | 63.8 | 64.5 | 64 | 65 | 59.5 | 57.5 |
|  | Sintered spinel 8 to 0.1 mm (by mass %) |  | — | — | — | — | — | — | — |
|  | Sintered alumina + Calcined alumina 0.1 mm or smaller (by mass %) |  | 23.5 | 23.5 | 23.5 | 23.5 | 23.5 | 23.5 | 23.5 |
|  | Sintered spinel 0.1 mm or smaller (by mass %) |  | — | — | — | — | — | — | — |
|  | Sintered magnesia 0.1 mm or smaller (by mass %) |  | 6 | 6 | 6 | 6 | 6 | 6 | 6 |
|  | Caustic magnesia (by mass %) |  | — | — | — | — | — | — | — |
|  | Silica flower (by mass %) |  | 0.5 | 0.5 | 0.5 | 0.5 | 0.5 | 0.5 | 0.5 |
|  | Aluminous cement (by mass %) |  | — | — | — | — | — | — | — |
|  | $Ca_X Sr_{1-X} Al_2 O_4$ | Addition amount (by mass %) | 5 | 5 | 2 | 2 | 2 | 4 | 6 |
|  |  | Value of X | 0.1 | 0.1 | 0.1 | 0.1 | 0.1 | 0.1 | 0.1 |
|  | $Ca_Y Sr_{1-Y} Al_4 O_7$ | Addition amount (by mass %) | — | — | 3 | 3 | 2 | 6 | 6 |
|  |  | Value of Y | — | — | 0.1 | 0.1 | 0.1 | 0.1 | 0.1 |
|  | $12(CaO)_Z (SrO)_{1-Z} \cdot 7Al_2 O_3$ | Addition amount (by mass %) | — | — | — | 0.5 | 0.5 | — | — |
|  |  | Value of Z | — | — | — | 0.1 | 0.1 | — | — |
|  | Polyvalent metal salt A of oxycarboxylic acid (by mass %) |  | 0.6 | 1.0 | 0.3 | 0.3 | 0.3 | 0.3 | 0.3 |
|  | Polyvalent metal salt B of oxycarboxylic acid (by mass %) |  | — | — | — | — | — | — | — |
|  | Chemical admixture (by mass %) |  | 0.2 | 0.2 | 0.2 | 0.2 | 0.2 | 0.2 | 0.2 |
| Evaluation | Time for hardening |  | A | A | A | A | A | A | A |
|  | Change over time |  | A | A | A | A | A | A | A |
|  | Dry constriction |  | A | B | A | A | A | A | B |
|  | Bending strength |  | A | A | A | A | A | A | A |
|  | Rotary erosion spall |  | A | A | A | A | A | A | A |
|  | Comprehensive evaluation |  | AA | A | AA | AA | AA | AA | A |

TABLE 2

|  |  |  | Example |  |  |  |  |  |  |  |  |  |  |  |  |  |
|---|---|---|---|---|---|---|---|---|---|---|---|---|---|---|---|---|
|  |  |  | 16 | 17 | 18 | 19 | 20 | 21 | 22 | 23 | 24 | 25 | 26 | 27 | 28 | 29 |
| Refractory raw material | Sintered alumina 8 to 0.1 mm (by mass %) |  | 64.5 | 64.5 | 64.5 | 64.5 | 64.5 | 44.5 | 49.5 | 54.5 | 54.5 | 49.5 | 64.6 | 64.5 | 64.5 | 64.8 |
|  | Sintered spinel 8 to 0.1 mm (by mass %) |  | — | — | — | — | — | 20 | 15 | 10 | 10 | 10 | — | — | — | — |
|  | Sintered alumina + Calcined alumina 0.1 mm or smaller (by mass %) |  | 27.5 | 26.5 | 20.5 | 17 | 14 | 27 | 25 | 20 | 5 | 5 | 21.5 | 23.5 | 23.5 | 23.5 |
|  | Sintered spinel 0.1 mm or smaller (by mass %) |  | — | — | — | — | — | 3 | 5 | 10 | 25 | 30 | — | — | — | — |
|  | Sintered magnesia 0.1 mm or smaller (by mass %) |  | 2 | 3 | 9 | 12 | 15 | — | — | — | — | — | 6 | 6 | 6 | 6 |
|  | Caustic magnesia (by mass %) |  | — | — | — | — | — | — | — | — | — | — | — | — | — | — |
|  | Silica flower (by mass %) |  | 0.5 | 0.5 | 0.5 | 1 | 1 | — | — | — | — | — | 0.5 | 0.5 | 0.5 | 0.5 |
|  | Aluminous cement (by mass %) |  | — | — | — | — | — | — | — | — | — | — | 2 | — | — | — |
|  | $Ca_X Sr_{1-X} Al_2 O_4$ | Addition amount (by mass %) | 5 | 5 | 5 | 5 | 5 | 5 | 5 | 5 | 5 | 5 | 5 | 5 | 5 | 5 |
|  |  | Value of X | 0.1 | 0.1 | 0.1 | 0.1 | 0.1 | 0.1 | 0.1 | 0.1 | 0.1 | 0.1 | 0.1 | 0.1 | 0.1 | 0.1 |
|  | $Ca_Y Sr_{1-Y} Al_4 O_7$ | Addition amount (by mass %) | — | — | — | — | — | — | — | — | — | — | — | — | — | — |

TABLE 2-continued

|  |  |  | Example | | | | | | | | | | | | | |
|---|---|---|---|---|---|---|---|---|---|---|---|---|---|---|---|---|
|  |  |  | 16 | 17 | 18 | 19 | 20 | 21 | 22 | 23 | 24 | 25 | 26 | 27 | 28 | 29 |
|  | $12(CaO)_Z(SrO)_{1-Z} \cdot 7Al_2O_3$ | Value of Y | — | — | — | — | — | — | — | — | — | — | — | — | — | — |
|  |  | Addition amount (by mass %) | — | — | — | — | — | — | — | — | — | — | — | — | — | — |
|  |  | Value of Z | — | — | — | — | — | — | — | — | — | — | — | — | — | — |
|  | Polyvalent metal salt A of oxycarboxylic acid (by mass %) |  | 0.3 | 0.3 | 0.3 | 0.3 | 0.3 | 0.3 | 0.3 | 0.3 | 0.3 | 0.3 | 0.2 | — | 0.2 | 0.05 |
|  | Polyvalent metal salt B of oxycarboxylic acid (by mass %) |  | — | — | — | — | — | — | — | — | — | — | — | 0.3 | 0.1 | — |
|  | Chemical admixture (by mass %) |  | 0.2 | 0.2 | 0.2 | 0.2 | 0.2 | 0.2 | 0.2 | 0.2 | 0.2 | 0.2 | 0.2 | 0.2 | 0.2 | 0.2 |
| Evaluation | Time for hardening |  | A | A | A | A | A | A | A | A | A | A | B | A | A | B |
|  | Change over time |  | A | A | A | A | A | A | A | A | A | A | A | A | A | A |
|  | Dry constriction |  | A | A | A | A | A | A | A | A | A | A | A | A | A | A |
|  | Bending strength |  | A | A | A | A | A | A | A | A | A | A | A | A | A | B |
|  | Rotary erosion spall |  | B | A | A | A | B | B | A | A | A | B | B | A | A | A |
|  | Comprehensive evaluation |  | A | AA | AA | AA | A | A | AA | AA | AA | A | B | AA | AA | B |

TABLE 3

|  |  |  | Comparative Example | | | | | |
|---|---|---|---|---|---|---|---|---|
|  |  |  | 1 | 2 | 3 | 4 | 5 | 6 |
| Refractory raw material | Sintered alumina 8 to 0.1 mm (by mass %) |  | 64.5 | 64.5 | 64.6 | 64.6 | 64.8 | 62.8 |
|  | Sintered spinel 8 to 0.1 mm (by mass %) |  | — | — | — | — | — | — |
|  | Sintered alumina + Calcined alumina 0.1 mm or smaller (by mass %) |  | 28.5 | 28.5 | 13.5 | 18.5 | 23.5 | 23.5 |
|  | Sintered spinel 0.1 mm or smaller (by mass %) |  | — | — | — | — | — | — |
|  | Sintered magnesia 0.1 mm or smaller (by mass %) |  | 5.7 | 5.8 | 6 | 6 | 6 | 6 |
|  | Caustic magnesia (by mass %) |  | 0.3 | — | — | — | — | — |
|  | Silica flower (by mass %) |  | 0.5 | 0.5 | 0.5 | 0.5 | 0.5 | 0.5 |
|  | Aluminous cement (by mass %) |  | — | — | — | — | — | — |
|  | $Ca_XSr_{1-X}Al_2O_4$ | Addition amount (by mass %) | — | 0.2 | 15 | 10 | 5 | 5 |
|  |  | Value of X | — | 0 | 0.1 | 0.7 | 0.1 | 0.1 |
|  | $Ca_YSr_{1-Y}Al_4O_7$ | Addition amount (by mass %) | — | — | — | — | — | — |
|  |  | Value of Y | — | — | — | — | — | — |
|  | $12(CaO)_Z(SrO)_{1-Z} \cdot 7Al_2O_3$ | Addition amount (by mass %) | — | — | — | — | — | — |
|  |  | Value of Z | — | — | — | — | — | — |
|  | Polyvalent metal salt A of oxycarboxylic acid (by mass %) |  | 0.3 | 0.3 | 0.2 | 0.2 | — | 2 |
|  | Polyvalent metal salt B of oxycarboxylic acid (by mass %) |  | — | — | — | — | — | — |
|  | Chemical admixture (by mass %) |  | 0.2 | 0.2 | 0.2 | 0.2 | 0.2 | 0.2 |
| Evaluation | Time for hardening |  | B | B | B | A | C | B |
|  | Change over time |  | C | B | A | A | A | A |
|  | Dry constriction |  | A | A | B | B | A | C |
|  | Bending strength |  | B | C | A | A | C | A |
|  | Rotary erosion spall |  | B | B | C | C | A | A |
|  | Comprehensive evaluation |  | C | C | C | C | C | C |

In each of embodiments and comparative example, as the refractory raw material, sintered alumina in which an amount of $Al_2O_3$ is 99.5 mass % and a grain size is within a ranges of 8 to 0.1 mm and 0.1 mm or smaller, sintered spinel in which an amount of MgO is 27 mass % and a grain size is within a ranges of 8 to 0.1 mm and 0.1 mm or smaller, calcined alumina having an average grain size of 1.5 μm, and sintered magnesia in which an amount of MgO is 95.2 mass % and a grain size is within a range of 0.1 mm or smaller, caustic magnesia in which an amount of MgO is 97.7 mass % and a BET specific surface area is 144 m²/g, silica flower in which an amount of $SiO_2$ is 98 mass % and an average grain size is 0.2 μm, aluminous cement in which an amount of CaO is 25 mass %, $Ca_XSr_{1-X}Al_2O_4$, $Ca_YSr_{1-Y}Al_4O_7$, $12(CaO)_Z(SrO)_{1-Z}\cdot 7Al_2O_3$, a polyvalent metal salt of oxycarboxylic acid, and as chemical admixture, a polycarboxylic acid-based water reducing agent and hardening regulator in total of 0.2 mass % were appropriately used.

$Ca_XSr_{1-X}Al_2O_4$, $Ca_YSr_{1-Y}Al_4O_7$, and $12(CaO)_Z(SrO)_{1-Z}\cdot 7Al_2O_3$ were manufactured respectively by the following methods. As raw materials, 99 mass % purity of $CaCO_3$, 98 mass % purity of $SrCO_3$, and 99 mass % purity of high-purity α-alumina were used. Each raw material was weighed in a balance to have a chemical composition (value of X, value of Y, value of Z) in Tables 1 to 3, and the raw material mixed and pulverized in a mortar was subjected to granulated forming by adding 1 mass % of water in an outer percentage. Then, the formed product was subjected to heat treatment at 1400° C. for 48 hours in a siliconit electric furnace. Then, a temperature was lowered to a room temperature and the product was allowed to be cooled in the air. The products obtained by pulverizing with a ball mill were respectively used as $Ca_XSr_{1-X}Al_2O_4$, $Ca_YSr_{1-Y}Al_4O_7$, $12(CaO)_Z(SrO)_{1-Z}\cdot 7Al_2O_3$.

In addition, in the polyvalent metal salt of oxycarboxylic acid, the basic aluminum lactate as a polyvalent metal salt A of oxycarboxylic acid and basic aluminum glycolate lactate as polyvalent metal salt B of oxycarboxylic acid were used.

Regarding "Time for hardening" in Tables 1 to 3, in a case where a material kneaded at an amount of moisture capable of obtaining appropriate fluidity was hardened at 20° C., the time for hardening which was 3 hours or longer and 8 hours or shorter and appropriate for work to a steelmaking processing apparatus is marked with A. In addition, the time for hardening, which was slightly short as 2 hours or longer and shorter than 3 hours, or slightly long as longer than 8 hours and 12 hours or shorter, is marked with B sign. The time for hardening, which was extremely short as shorter than 2 hours or is longer than 12 hours, is marked with C.

Regarding "Change over time", a time for hardening of the material that was stored for 90 days in a paper bag was measured under the same conditions as the "time for hardening". The change over time in which change in time for hardening was within 15% is marked with A. The change over time in which change in time for hardening was 15% or more and 30% or less is marked with B. The change over time in which change in time for hardening was 30% or more is marked with C.

Regarding "dry constriction", a material kneaded at an amount of moisture capable of obtaining appropriate fluidity was cast in a shape of 40×40×160 mm. The cast material was hardened at 20° C. for 24 hours, and then dried at 110° C. for 24 hours. Constriction of a test piece in a longitudinal direction after drying from post-hardening which was small as 0.1% or less is marked with A. In addition, the constriction which was more than 0.1% and 0.2 or less is marked with B, and the constriction which was more than more than 0.2% is marked with C.

Regarding "bending strength", three-point bending strength of the test piece after drying at 110° C., in which "drying constriction" was measured, were measured. The bending strength which was high strength as 8 MPa or higher is marked with A. In addition, the bending strength which was 5 MPa or higher and lower than 8 MPa is marked as B, and the bending strength which was lower than 5 MPa is marked with C.

Regarding "rotary erosion spall", the test piece manufactured by casting the material kneaded at an amount of moisture capable of obtaining appropriate fluidity was hardened at 20° C. for 24 hours, and dried at 110° C. for 24 hours. Then, operations of {heating the test piece to 1650° C., putting converter slag thereto, keeping the test piece for one hour, discharging the slag, and performing air cooling for 30 minutes} sere repeated five times, using a slag rotary type erosion testing apparatus. Crack initiation was evaluated using the erosion and spalling. The rotary erosion spall in which both erosion and crack slightly occurred is marked with A. A case in which any one of erosion and crack was slight and the other was not extremely bad is marked with B. A case in which both of erosion and crack were not slight, is marked with C.

Regarding "comprehensive evaluation", a case in which all of evaluation were extremely good as A is marked with AA. A case in which there is one B but remaining evaluations were good as A is marked with B. A case in which there are two B but remaining evaluation were good as A is marked with B, and others thereof are marked with C. It is represented that the evaluation becomes bad in the order of AA, A, B, C.

Examples 1 to 29 in Tables 1 and 2 are examples of the present invention, and the monolithic refractory in which the comprehensive evaluations of the time for hardening, the dry constriction, the bending strength, and the rotary erosion spall were good was obtained.

Among Examples 11 to 15, the comprehensive evaluations of Examples 11 to 14 in which "a total amount of $Ca_XSr_{1-X}Al_2O_4$ (where, 0≤X≤0.5), $Ca_YSr_{1-Y}Al_4O_7$ (where, 0≤Y≤0.5), $12(CaO)_Z(SrO)_{1-Z}\cdot 7Al_2O_3$ (where, 0≤Z≤0.5)" was in a preferable range (10 mass % or less) are AA. However, in Example 15 in which the amount thereof was out of the range, good monolithic refractories were obtained but the comprehensive evaluation is slightly deteriorated as A.

Among Examples 16 to 20, the comprehensive evaluations of Examples 17 to 19 in which "magnesia raw material having a grain size of 0.1 mm or smaller" was in a preferable range (3 to 12 mass %) are AA. On the other hand, in Examples 16 and 20 in which the amount thereof was out of the range, good monolithic refractories were obtained but the comprehensive evaluation is slightly deteriorated as A.

In addition, among Examples 21 to 25, the comprehensive evaluation of Examples 22 to 24 in which "spinel raw material having a grain size of 0.1 mm or smaller" is in a preferable range (5 to 25 mass %) are AA. On the other hand, in Examples 21 and 25 in which the amount thereof was out of the range, good monolithic refractories were obtained but the comprehensive evaluation is slightly deteriorated as A.

Example 26 is an example in which the aluminous cement is used in combination. In Example 26, a good monolithic refractory was obtained, but the comprehensive evaluation is B.

Example 29 is within the scope of the present invention, but is an example in which the amount of oxycarboxylic acid used is small. A good monolithic refractory was obtained, but the time for hardening was slightly long and the strength was slightly low. Therefore, the comprehensive evaluation is B.

Comparative Example 1 of Table 3 is an example in which the caustic magnesia of the related art and the polyvalent metal salt of oxycarboxylic acid were used in combination. The hardening is somewhat slow, the change over time is extremely large. The strength is somewhat low, and a lot of slight cracks are in the rotary erosion spall.

Comparative Example 2 is an example in which an amount of $Ca_xSr_{1-x}Al_2O_4$ to be used is smaller than the scope of the present invention. In Comparative Example 2, hardening is somewhat slow, the change over time is somewhat large. The strength is low, and some cracks are in the rotary erosion spall.

Comparative Example 3 is an example in which an amount of $Ca_xSr_{1-x}Al_2O_4$ to be used is larger than the scope of the present invention. In Comparative Example 3, the time for hardening is somewhat slow, the hardening constriction is somewhat large. A lot of cracks are in the rotary erosion spall.

Comparative Example 4 is an example in which a value of X in $Ca_xSr_{1-x}Al_2O_4$ is greater than the scope of the present invention. In Comparative Example 4, the hardening constriction is somewhat large, and the corrosion resistance at the rotary erosion spall is poor.

Comparative Example 5 is an example in which an amount of the polyvalent metal salt of oxycarboxylic acid to be used is smaller than the scope of the present invention. In Comparative Example 5, the time for hardening is extremely long and the strength is extremely low.

Comparative Example 6 is an example in which an amount of the polyvalent metal salt of oxycarboxylic acid to be used is larger than the scope of the present invention. In Comparative Example 6, the time for hardening is somewhat short and the dry constriction is extremely large.

INDUSTRIAL APPLICABILITY

According to the present invention, it is possible to quickly develop and increase the strength of the monolithic refractory in which the aluminous cement is not used or an extremely small amount of the aluminous cement is used, and a CaO content is small.

The invention claimed is:

1. A monolithic refractory, wherein, in terms of a proportion in 100 mass % of a refractory raw material having a grain size of 8 mm or smaller,
    an amount of $Ca_xSr_{1-x}Al_2O_4$ (where, $0 \leq X \leq 0.5$) is 0.5 mass % or more and 10 mass % or less, and
    an amount of a polyvalent metal salt of oxycarboxylic acid is 0.05 mass % or more and 1.0 mass % or less.

2. The monolithic refractory according to claim 1, wherein an amount of the polyvalent metal salt of oxycarboxylic acid is 0.1 mass % or more and 1.0 mass % or less.

3. The monolithic refractory according to claim 1, wherein, in terms of a proportion in 100 mass % of a refractory raw material having a grain size of 8 mm or smaller,
    a total amount of $Ca_xSr_{1-x}Al_2O_4$ (where, $0 \leq X \leq 0.5$), $Ca_ySr_{1-y}Al_4O_7$ (where, $0 \leq Y \leq 0.5$), and $12(CaO)_Z(SrO)_{1-Z} \cdot 7Al_2O_3$ (where, $0 \leq Z \leq 0.5$) is 10 mass % or less.

4. The monolithic refractory according to claim 1, wherein, in terms of a proportion in 100 mass % of the refractory raw material,
    an amount of a magnesia raw material having a grain size of 0.1 mm or smaller is 3 mass % or more and 12 mass % or less.

5. The monolithic refractory according to claim 1, wherein, in terms of a proportion in 100 mass % of the refractory raw material,
    an amount of a spinel raw material having a grain size of 0.1 mm or smaller is 5 mass % or more and 25 mass % or less.

6. The monolithic refractory according to claim 1, wherein, in terms of a proportion in 100 mass % of the refractory raw material,
    a total amount of a spinel raw material or an alumina raw material, having a grain size of larger than 0.1 mm and 8 mm or smaller, or combination thereof is 55 mass % or more and 75 mass % or less.

* * * * *